US012566490B1

(12) United States Patent
Nasir et al.

(10) Patent No.: US 12,566,490 B1
(45) Date of Patent: Mar. 3, 2026

(54) SYSTEMS AND METHODS TO SUPPLY POWER FROM A VEHICLE TO INFRASTRUCTURE

(71) Applicant: Ford Global Technologies, LLC, Dearborn, MI (US)

(72) Inventors: Mansoor Nasir, Canton, MI (US); Mahmoud Yousef Ghannam, Canton, MI (US); Rami Al Khatib, Dearborn, MI (US)

( * ) Notice: Subject to any disclaimer, the term of this patent is extended or adjusted under 35 U.S.C. 154(b) by 0 days.

(21) Appl. No.: 18/825,282

(22) Filed: Sep. 5, 2024

(51) Int. Cl.
| | |
|---|---|
| *G06F 3/01* | (2006.01) |
| *G06F 3/14* | (2006.01) |
| *G06T 11/00* | (2006.01) |
| *G06T 19/00* | (2011.01) |

(52) U.S. Cl.
CPC ............ G06F 3/011 (2013.01); G06F 3/1423 (2013.01); G06T 11/00 (2013.01); *G06T 19/006* (2013.01); *G06T 2210/12* (2013.01)

(58) Field of Classification Search
CPC ........ G06F 3/011; G06F 3/1423; G06T 11/00; G06T 2210/12; G06T 19/006
See application file for complete search history.

(56) References Cited

U.S. PATENT DOCUMENTS

| | | | |
|---|---|---|---|
| 10,099,608 B2 | 10/2018 | Cuddihy et al. | |
| 10,901,081 B2 | 1/2021 | Chiarella et al. | |
| 11,826,651 B2 | 11/2023 | Black et al. | |
| 2015/0097864 A1* | 4/2015 | Alaniz ................... | A63F 13/216 |
| | | | 345/633 |
| 2017/0113702 A1* | 4/2017 | Thieberger-Navon ....................... | |
| | | | B60W 50/0097 |
| 2018/0040162 A1* | 2/2018 | Donnelly ........... | G02B 27/0093 |
| 2019/0375312 A1 | 12/2019 | Petersson et al. | |
| 2021/0335045 A1* | 10/2021 | Kuehne ................ | B60N 2/0021 |
| 2024/0005788 A1 | 1/2024 | Williams et al. | |

OTHER PUBLICATIONS

Automotive XR , Automotive XR (VR/AR/MR) Industry Report, www.researchinchina.com/Htmls/Report/2024/74968.html, 2024, pp. 1-4.

* cited by examiner

*Primary Examiner* — Adam R. Giesy
(74) *Attorney, Agent, or Firm* — Joseph Zane; Eversheds Sutherland (US) LLP

(57) ABSTRACT

Systems and methods for monitoring user behavior while wearing a virtual reality device within a vehicle are provided. A vehicle may detect presence of a user wearing a virtual reality device within the vehicle. The vehicle may also detect presence of other users in the vehicle. The vehicle may determine the location of the user with respect to the vehicle dimensions and with respect to the other users. The vehicle may determine a virtual bounding box for the user based on the gathered information. Thereafter, the vehicle may monitor the user motion to determine whether the user is breaching the boundaries of the virtual bounding box. If at any point the user physically breaches the boundaries of the virtual bounding box due to his motion, the vehicle may generate an alert notifying the user that his motion may inconvenience other fellow passengers and/or impede with the operation of the vehicle.

19 Claims, 9 Drawing Sheets

100

110

104

108

102

112

316     318

322     322     318

242

| | |
|---|---|
| 402<br><br>Bounding Box Estimation Unit | 404<br><br>Motion and Gesture Tracking unit |
| 406<br><br>Alert and Notification Unit | 408<br><br>Communication Interface |

500

502 Detect presence of a user in the vehicle

504 Determine location of the user within the vehicle

506 Determine a user type associated with the user

508 Determine that the user is wearing a VR device

510 Determine a bounding box associated with the user

512 Monitor user motion and gesture

514 Generate an alert if a portion of the user body travels outside the bounding box

600

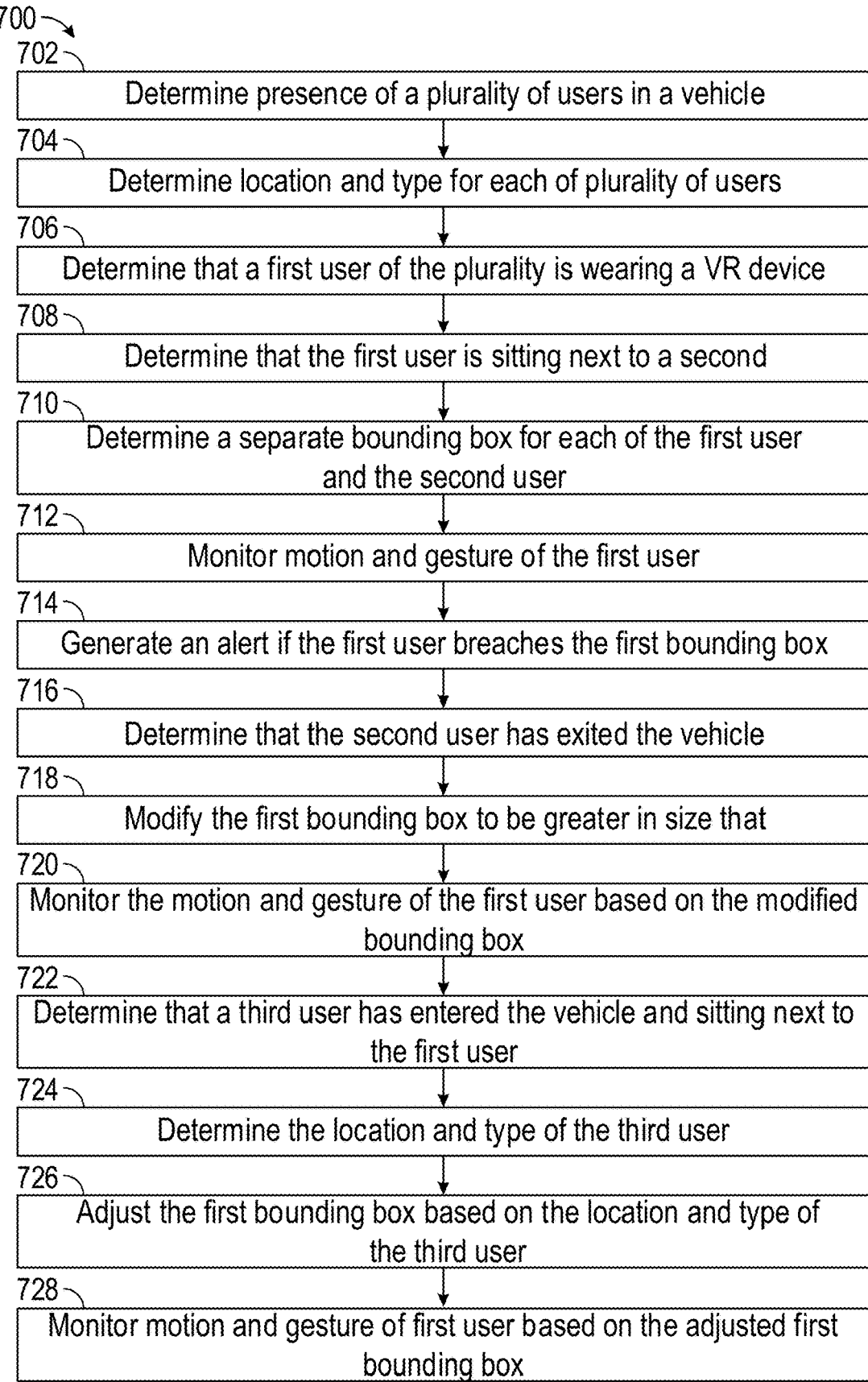

700

702
Determine presence of a plurality of users in a vehicle

704
Determine location and type for each of plurality of users

706
Determine that a first user of the plurality is wearing a VR device

708
Determine that the first user is sitting next to a second

710
Determine a separate bounding box for each of the first user and the second user 712
Monitor motion and gesture of the first user 714
Generate an alert if the first user breaches the first bounding box 716
Determine that the second user has exited the vehicle 718
Modify the first bounding box to be greater in size that 720
Monitor the motion and gesture of the first user based on the modified bounding box 722
Determine that a third user has entered the vehicle and sitting next to the first user 724
Determine the location and type of the third user 726
Adjust the first bounding box based on the location and type of the third user 728
Monitor motion and gesture of first user based on the adjusted first bounding box

FIG. 7

SYSTEMS AND METHODS TO SUPPLY POWER FROM A VEHICLE TO INFRASTRUCTURE

FIELD

The present disclosure relates to the field of using virtual reality devices within a vehicle.

BACKGROUND

Use of virtual reality and other similar technologies is on the rise. People use virtual reality devices in various types of environments such as when walking, in the house, in a vehicle, etc. Use of such devices can result in the user being unaware of his/her surroundings, which can lead to unwanted situations.

In tight or restricted spaces, such as a vehicle, the potential issues that can arise while using a virtual reality or similar device can be exacerbated. For example, a passenger who is using a virtual reality device in a vehicle may suffer from impaired perception and delayed reaction times that may result in physical contact with other passengers in the vehicle, inadvertent operation of vehicle controls, displacement of objects within the vehicle, etc. There is a need for a system that can alert a user of a potential issue while the user is engaged with a virtual reality device so that the user may take necessary corrective action.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 7 is a flow diagram for a process according to yet another embodiment of the present disclosure.

DETAILED DESCRIPTION

Overview

Figure 1:
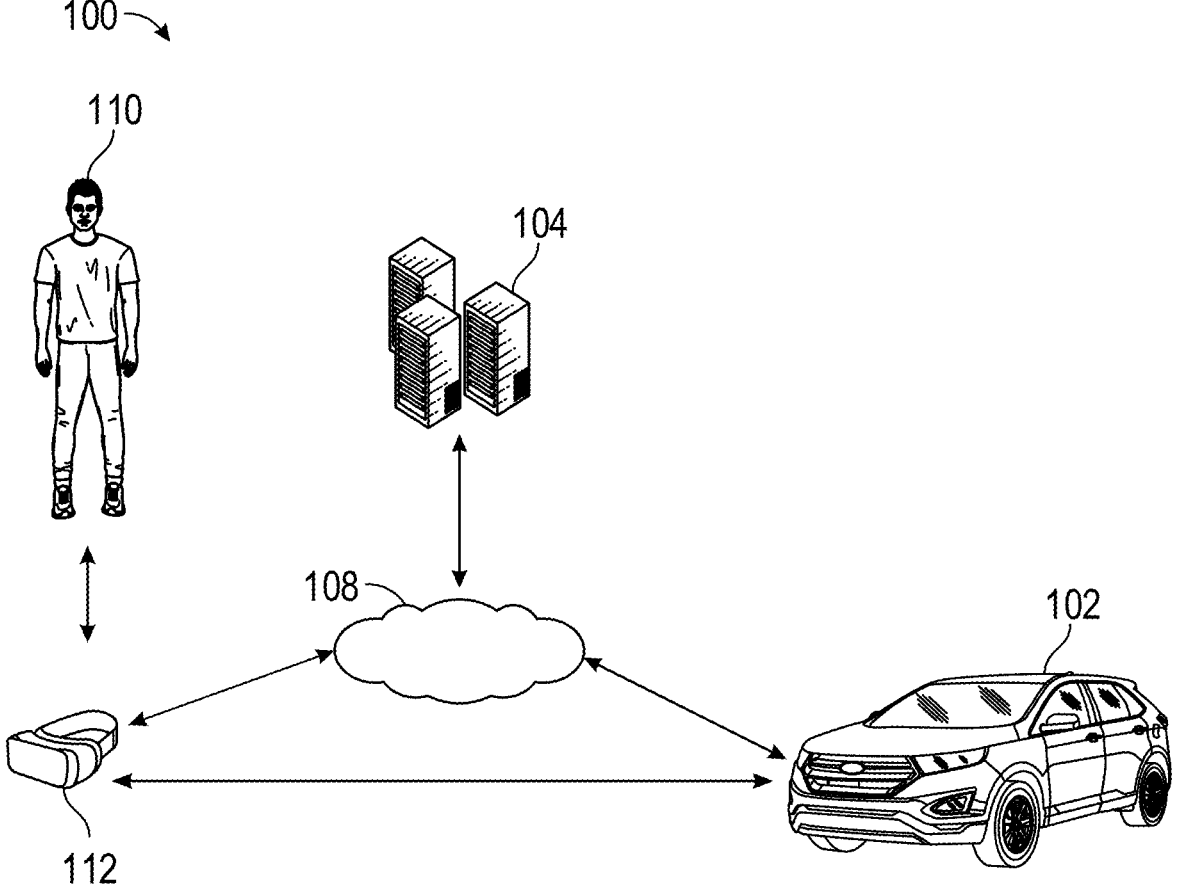
FIG. 1 illustrates an environment in which embodiments of the present disclosure can be implemented.

The present disclosure describes systems and methods for use of virtual reality and similar devices within a vehicle. Specifically, embodiments of the present disclosure provide for monitoring of user behavior while the user is using a virtual reality device within a vehicle and generating alerts and taking certain actions if the user behavior is likely to cause inconvenience to fellow passengers in the vehicle and/or interfere with the operation of the vehicle.

Embodiments of the present disclosure provide a method for mitigating unwanted events that may occur due to the use of virtual reality devices within a vehicle. The method includes the vehicle determining presence of a user in the vehicle and a location of the user within the vehicle. The method further includes the vehicle determining that the user is wearing a virtual reality (VR) device. Based on this determination, the vehicle then determines a virtual bounding box for the user based on the location of the user and one or more dimensions of the vehicle. The method further comprises the vehicle determining one or more objects in the vicinity of the user within the vehicle, and relative locations of the one or more objects with respect to the user. The vehicle then determines a priority level associated with each of the one or more objects. Thereafter, the vehicle determines motion and gesture data associated with the user and based on the motion and gesture data, the vehicle determines whether the user is likely to make contact with a first object of the plurality of objects. If the vehicle determines that the user is likely to make contact with the first object, the vehicle generates a message alerting the user of the potential contact with the first object. In some embodiments, one or more of the aforementioned steps may be executed by a single device, such as the vehicle, a remote control server associated with the vehicle, a device connected to the device, such as a VR device, or any combination thereof.

In another instance, a method of monitoring user actions while wearing a virtual reality device within a vehicle is provided. The method includes the vehicle determining, at a first time, presence of a first user in the vehicle and presence of a second user in the vehicle. Thereafter, the vehicle determines a relative location of the first user and the second user with respect to each other and with respect to the interior of the vehicle. The method further includes the vehicle determining that the first user is wearing a virtual reality device and determining a bounding box for the first user based on a relative location of the first user with respect to the second user. Thereafter, the vehicle determines at a second time, absence of the second user in the vehicle and then adjusts the first user bounding box to a second bounding box, wherein the area of the second bounding box is larger than the area of the first bounding box.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 illustrates an environment 100 in which the embodiments of the present disclosure may be implemented. The environment includes a vehicle 102 that may have a virtual reality management system installed in it. The vehicle 102 can be any passenger or commercial vehicle such as a car, truck, tanker, bus, or the like.

The environment 100 may also include a control server 104. The control server 104 may be part of a cloud-based computing infrastructure and may be associated with and/or include a Telematics Service Delivery Network (SDN) that provides digital data services to the vehicle 102. Details of the control server 104 are provided below with reference to FIG. 8.

The environment 100 may also include a user device 112. The user device 112 may be one of a mobile phone, a virtual reality (VR) device, an augmented reality (AR) device, or the like. The user device 112 may be associated with a user 110 of the vehicle 102. The user 110 may be a driver of the vehicle 102 or a passenger in the vehicle 102. The user device 112 may receive information from the vehicle 102 and/or the control server 104. The user device 112 may have a specialized application installed on it that can interface with the vehicle 102 to download and display various types vehicle generated information and other control data. In one embodiment, the vehicle 102 may control the user device 112 such that the vehicle 102 may shut down or interrupt the operation of the user device 112 under certain circumstances by directly communicating with the user device 112 without the need for the network 108 and/or the server 104.

The environment 100 may further include a network 108. The network 108 illustrates an example communication infrastructure in which the connected devices discussed in various embodiments of this disclosure may communicate. The network 108 may be and/or include the Internet, a private network, public network or other configuration that operates using any one or more known communication protocols such as, for example, transmission control protocol/Internet protocol (TCP/IP), Bluetooth®, Bluetooth® low Energy (BLE), Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer, a Vehicle Control Unit (VCU), and a detection unit. Details of the vehicle 102 are provided below in reference to FIG. 2.

Figure 2:
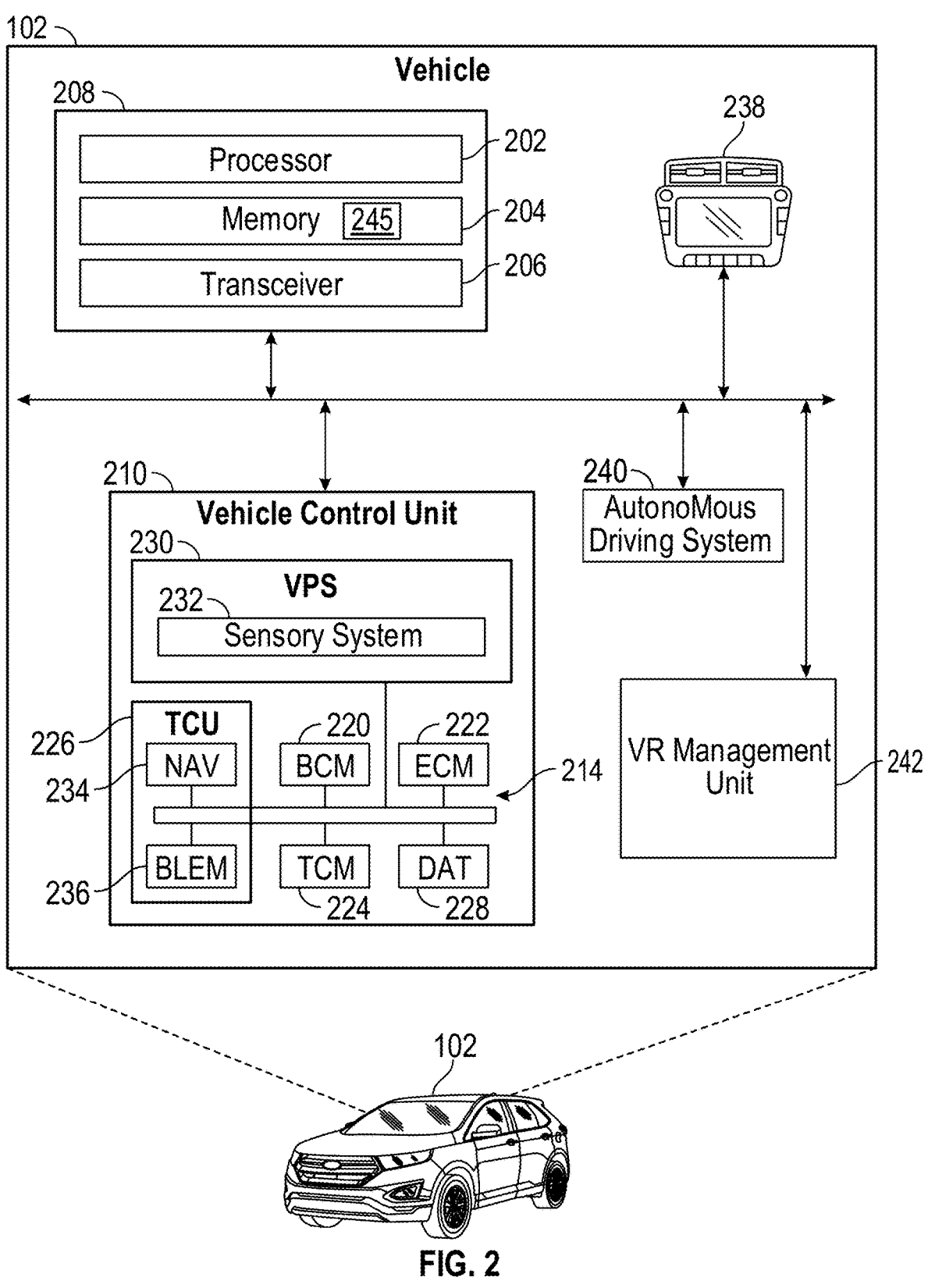
FIG. 2 illustrates a block diagram of a vehicle according to an embodiment of the present disclosure.

FIG. 2 illustrates a block diagram of the vehicle 102 in which embodiments of the present disclosure can be implemented. The vehicle 102 may include a plurality of units including, but not limited to, an automotive computer 208, a Vehicle Control Unit (VCU) 210, and an infotainment unit 238. The VCU 210 may include a plurality of Electronic Control Units (ECUs) 214 disposed in communication with the automotive computer 208.

In some embodiments, a user device, such as a mobile phone, a laptop computer, or the like may be configured to connect with the automotive computer 208, which may communicate via one or more wireless connection(s), and/or may connect with the vehicle 102 directly by using near field communication (NFC) protocols, Bluetooth® protocols, Wi-Fi, Ultra-Wide Band (UWB), and other possible data connection and sharing techniques.

The automotive computer 208 may be installed anywhere in the vehicle 102, in accordance with the disclosure. The automotive computer 208 may be or include an electronic vehicle controller, having one or more processor(s) 202, one or more memories 204, and one or more transceivers 206.

The processor(s) 202 may be disposed in communication with one or more memory devices disposed in communication with the respective computing systems (e.g., the memory 204 and/or one or more external databases not shown in FIG. 2). The processor(s) 202 may utilize the memory 204 to store programs in code and/or to store data for performing operations in accordance with the disclosure. The memory 204 may be a non-transitory computer-readable storage medium or memory storing a vehicle control program code. The memory 204 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.). In some embodiments, memory 204 may include a module 245 that can implement the various embodiments of the present disclosure. Module 245 may include instructions that can be executed by the processor 202 to realize the various embodiments of the present disclosure.

Automotive computer 208 may also include a transceiver 206. The transceiver 206 may be configured to receive information/inputs from one or more external devices or systems, e.g., a user device 208, an external server, and/or the like. Further, the transceiver 206 may transmit notifications, requests, signals, etc. to the external devices or systems. In addition, the transceiver 206 may be configured to receive information/inputs from vehicle components such as the vehicle sensory system 232, one or more ECUs 214, and/or the like. Further, the transceiver 206 may transmit signals (e.g., command signals) or notifications to the vehicle components such as the BCM 220, the infotainment system 238, and/or the like.

In some embodiments, the VCU 210 may share a power and/or communications bus with the automotive computer 208 and may be configured and/or programmed to coordinate the data between vehicle systems, connected servers and/or the like. The VCU 210 may include or communicate with any combination of the ECUs 214, such as, for example, the BCM 220, an Engine Control Module (ECM) 222, a Transmission Control Module (TCM) 224, a Telematics Control Unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232. The vehicle sensory system 232 may include one or more vehicle sensors including, but not limited to, a Radio Detection and Ranging (RADAR or "radar") sensor configured for detection and localization of objects inside and outside the vehicle 102 using radio waves, sitting area buckle sensors, sitting area sensors, a Light Detecting and Ranging ("LIDAR") sensor, door sensors, proximity sensors, temperature sensors, wheel sensors, one or more ambient weather or temperature sensors, vehicle interior and exterior cameras, steering wheel sensors, etc. The sensors that are part of the vehicle sensory system 232 may be coupled to the vehicle 102 at one or more locations and in one or more manner. For example, the various sensors of the vehicle sensory system 232 may be integrated into the various subsystems of the vehicle 102, such as doors, mirrors, roof, etc. or attached to the vehicle 102 using an appropriate mounting mechanism. In some embodiments, the various sensors of the vehicle sensory system 232 may be located at the front, back, sides, top, bottom, and underneath the vehicle 102. The location of a sensor may depend on its function. For example, a sensor that monitors the area underneath the vehicle may be connected to a bottom surface of the vehicle 102 while a sensor that can monitor an area to either side of the vehicle 102 may be mounted or integrated into the doors of the vehicle 102.

Vehicle sensory system 232 may also include one or more road noise sensors such as accelerometers that are coupled to various mechanical components and/or systems of the vehicle 102. One skilled in the art will realize that the sensors may be coupled to the vehicles in various different ways and locations other than the ones mentioned above.

In some embodiments, the VCU 210 may control vehicle operational aspects and implement one or more instruction sets received from the server 104, the user device 112, or from one or more instruction sets stored in the memory 204.

The TCU 226 may be configured and/or programmed to provide vehicle connectivity to wireless computing systems onboard and off board the vehicle 102, and may include a Navigation (NAV) receiver 234 for receiving and processing a GPS signal, a BLE® Module (BLEM) 236, a Wi-Fi transceiver, a UWB transceiver, and/or other wireless transceivers (not shown in FIG. 2) that may be configurable for wireless communication (including cellular communication) between the vehicle 102 and other systems (e.g., a vehicle key fob (not shown in FIG. 2), an external server, a user device, etc.), computers, and modules. The TCU 226 may be in communication with the ECUs 214 by way of a bus. In some aspects, the TCU 226 may be configured to determine a real-time vehicle geolocation, e.g., via the NAV receiver 234.

The ECUs 214 may control aspects of vehicle operation and communication using inputs from human drivers, inputs from the automotive computer 208, and/or via wireless signal inputs received via the wireless connection(s) from other connected devices, such as the server 206, among others.

The BCM 220 generally includes integration of sensors, vehicle performance indicators, and variable reactors associated with vehicle systems, and may include processor-based power distribution circuitry that may control functions associated with the vehicle body such as lights, windows, security, camera(s), audio system(s), speakers, wipers, door locks and access control, various comfort controls, etc. The BCM 220 may also operate as a gateway for bus and network interfaces to interact with remote ECUs (not shown in FIG. 2).

The DAT controller 228 and/or the autonomous driving system 240 may provide Level-1 through Level-3 automated driving and driver assistance functionality that may include, for example, active parking assistance, vehicle backup assistance, and/or adaptive cruise control, among other features. The DAT controller 228 may also provide aspects of user and environmental inputs usable for user authentication.

In some embodiments, the automotive computer 208 may connect with an infotainment system 238 (or a vehicle Human-Machine Interface (HMI)). The infotainment system 238 may include a touchscreen interface portion, and may include voice recognition features, biometric identification capabilities that may identify users based on facial recognition, voice recognition, fingerprint identification, or other biological identification means. In other aspects, the infotainment system 238 may be further configured to receive user instructions via the touchscreen interface portion, and/or output or display notifications, navigation maps, etc. on the touchscreen interface portion.

The computing system architecture of the automotive computer 208 and/or the VCU 210 may omit certain computing modules. It should be readily understood that the computing environment depicted in FIG. 2 is an example of a possible implementation according to the present disclosure, and thus, it should not be considered as limiting or exclusive.

In some embodiments, vehicle 102 may include an autonomous driving system 240. Vehicle 102 may be manually driven or configured to operate, using the autonomous driving system 240, in a fully autonomous mode (e.g., Level-5 autonomy) or in one or more partial autonomous modes which may include driver assist technologies. In an embodiment, the DAT controller 228 may be part of the autonomous driving system 240. Examples of partial autonomous (or driver assist) modes are widely understood in the art as autonomy Levels 1 through 4. For example, a vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver who performs non-automated operations such as braking and other controls. In some embodiments, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road issue or a system event.

Level-5 AVs may include fully autonomous vehicle systems that require no human input for operation and may not include human operational driving controls.

In an embodiment, the vehicle 102 may also include a virtual reality management unit/module 242, which may be removably coupled to the vehicle 102. The virtual reality management unit 242 may control certain aspects of the virtual reality experience of the user device 112 when the user device 112 is used within the vehicle 102. Details of the virtual reality management module 242 are provide below with reference to FIG. 4. In other embodiments, the virtual reality management module 242 may be implemented in the VCU 210 of the vehicle 102.

In addition to the components noted above, the vehicle 102 may have numerous mechanical systems and subsystems. A chassis or frame may form the backbone of the vehicle 102 and support the body and other components of the vehicle 102. The vehicle 102 may include an engine that converts fuel into mechanical power, propelling the vehicle forward. The engine includes various components such as the engine block, pistons, valves, and spark plugs. The vehicle 102 also includes a transmission system. The transmission system transfers the engine's power to the wheels. It includes the clutch, gearbox, driveshaft, and differentials, among other components. The transmission adjusts the power output to suit the vehicle's speed and load. The vehicle 102 may also include a suspension system. The suspension system absorbs shocks and maintains contact between the tires and the road, providing a smooth ride. It includes components such as springs, shock absorbers, and linkages. The vehicle 102 also includes a braking system that allows the driver to slow down or stop the vehicle 102. It includes components like brake pedals, master cylinder, brake lines, and brake pads or shoes. The vehicle 102 also includes a steering system that enables the driver to guide the car. The steering system includes components such as the steering wheel, steering column, rack and pinion, and tie rods. The vehicle 102 also includes an exhaust system that removes and filters the waste gases produced by the engine. It includes the exhaust manifold, catalytic converter, muffler, and tailpipe, among other components. The vehicle 102 also includes a cooling system that prevents the engine from overheating. It includes components such as the radiator, water pump, thermostat, and coolant. The vehicle 102 also includes a cooling system that stores and supplies fuel to the engine. It includes the fuel tank, fuel pump, fuel filter, and fuel injectors. An electrical system of the vehicle 102 powers the car's electrical components. It includes the battery, alternator, starter motor, and wiring. The Heating, Ventilation, and Air Conditioning (HVAC) system regulates the temperature inside the vehicle 102. It includes the heater core, blower motor, and air conditioning compressor. In some embodiments, the vehicle may be an electric vehicle (EV) or hybrid vehicle, and in either case some of the aforementioned components would be replaced by an electric motor and battery. All of the mechanical components working together ensure that the vehicle operates optimally.

Use of personal devices such as tablets, phones, etc. has long been common place in vehicles. With the advent of virtual/augmented reality devices, users are now also using these devices when riding in a vehicle. While a phone or a tablet may be less distracting as the user is still aware of his/her surroundings, the virtual reality devices are more immersive and often are worn over the user's eyes and ears. This reduces the spatial awareness of the user. In addition, when the user is actively using such a device, the user may move his/her hands or legs in response to the activity he/she is engaged in within the virtual reality world. This may not pose an issue if the user is within a large space such as a house or outdoors. However, in constricted spaces, like a vehicle this can result in unwanted situations such as physical contact with fellow passengers, contact with controls of the vehicle, etc. There is a need for a system that can allow a user to enjoy a virtual reality device within a vehicle while mitigating the issues that may arise due to use of such a device. As will be appreciated, while a vehicle is in use, there may be local, state or federal laws and regulations restricting the use of the virtual reality device, and that must be complied with by the vehicle user. It is to be noted that while in current vehicle designs there would be concerns with a driver using virtual reality systems while the vehicle is in motion, it is anticipated that technology and the regulatory framework may evolve in the future to where such an activity is permissible.

Figure 3A:
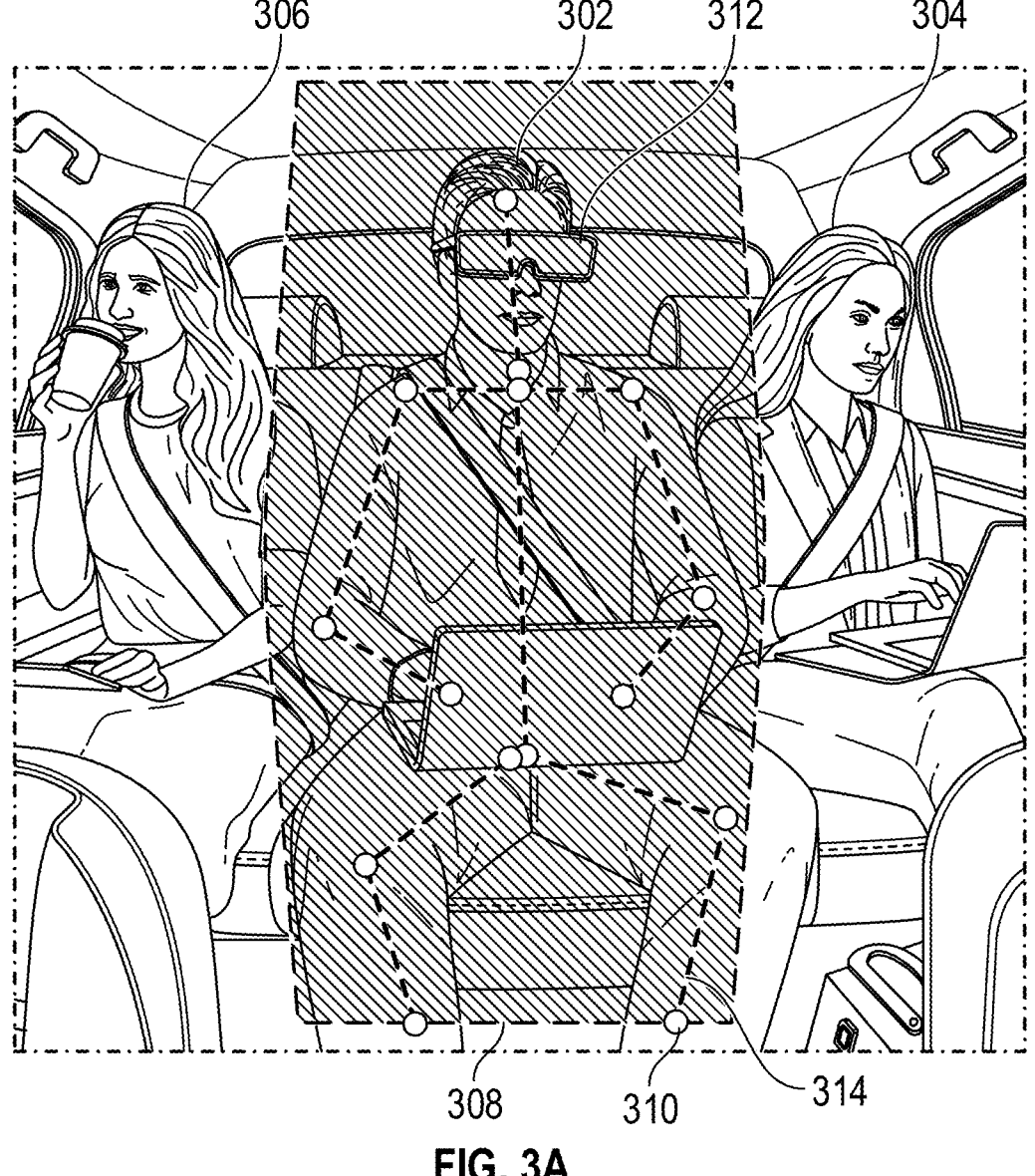
FIGS. 3A-3D illustrate the workings of a system according to an embodiment of the present disclosure.
Figure 3B:
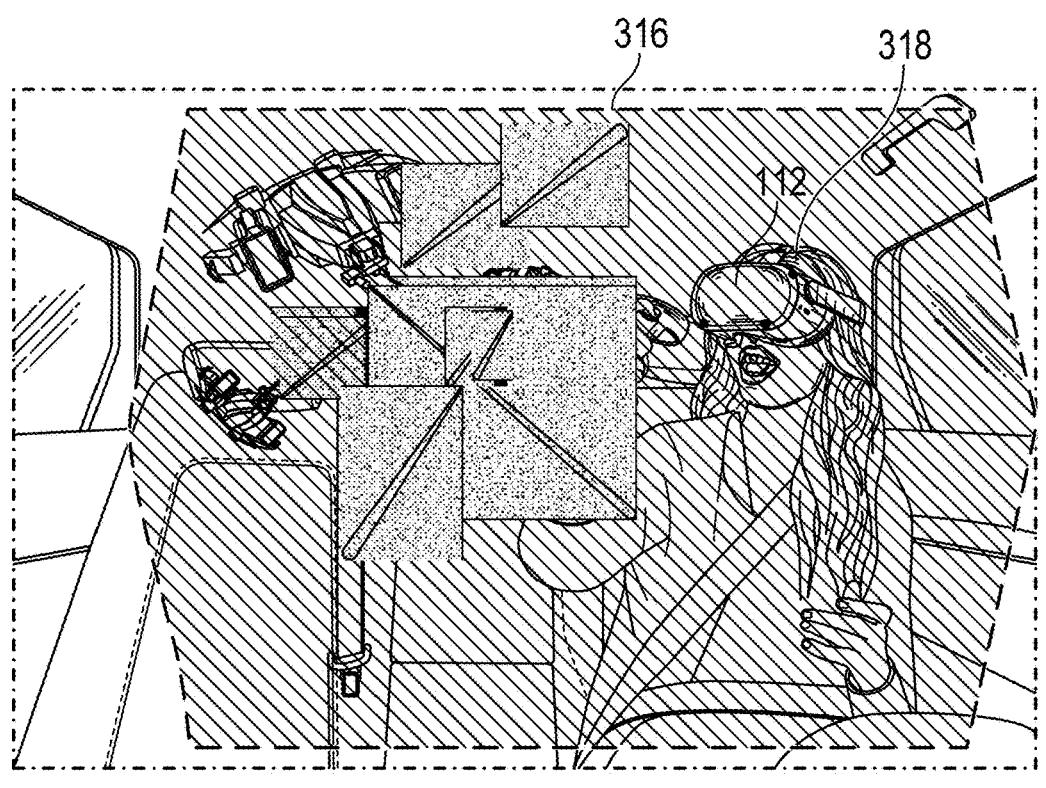
Figure 3C:
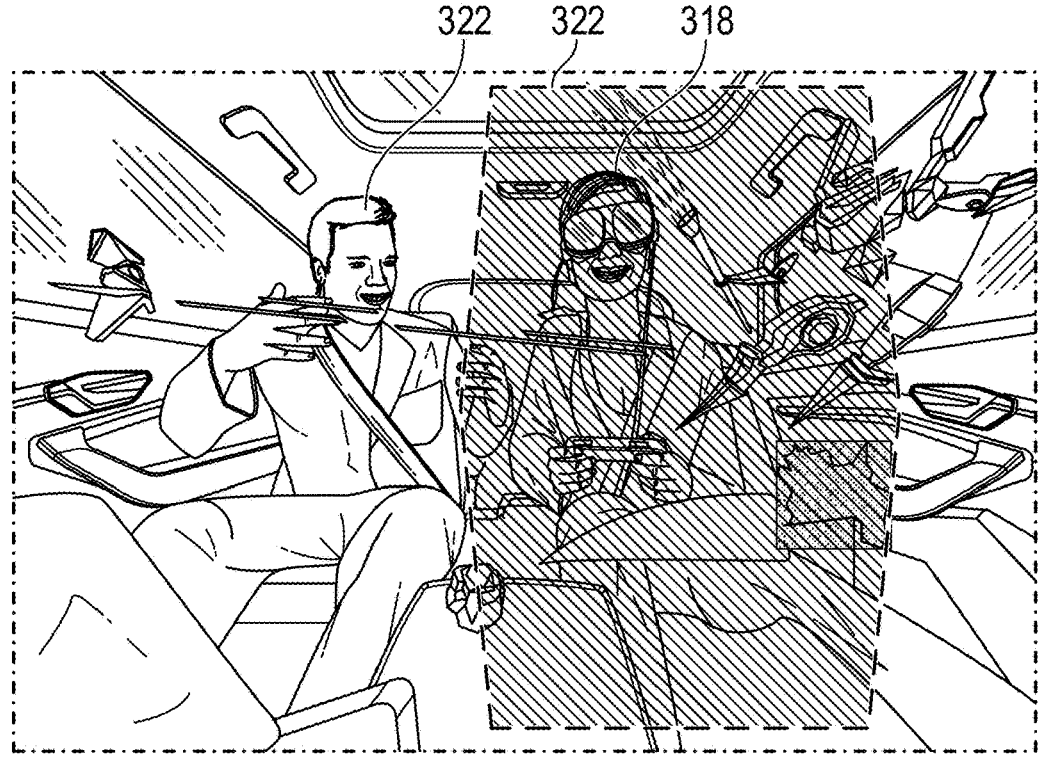

FIGS. 3A-3C illustrate the workings of a system according to an embodiment of the present disclosure. FIG. 3A illustrates three users 302, 304, and 306 sitting inside a vehicle. User 302 is wearing a virtual reality device 312. After the users 302, 304, and 306 enter the vehicle, the vehicle can determine whether any of the users are wearing a virtual reality device. For example, the vehicle can use its internal sensors, such as a camera, that can capture image(s) of the passenger cabin of the vehicle. Based on the analysis of the image(s) and/or video captured by the vehicle sensors, the vehicle can determine that the user 302 is wearing the virtual reality device 312. The vehicle also determines, based on the same or additional image/video data that two other users 304 and 306 are seated next to the user 302. The vehicle can then further determine a type associated with one or more of the users 302, 304, and 306. In an embodiment, the type of the user may depend on the size of the user and the user may generally be classified as small, medium, or large. In one embodiment, the type of the user may be determined using stereoscopic images of the person and since the approximate distance between the sensors capturing the stereoscopic images and the user is known, an approximate size of the person may be determined.

Once the vehicle determines the type of the users 302, 304, and 306, it may determine a virtual bounding box 308 for the user 302 who is using the virtual reality device 112. The virtual bounding box 308 represents the limits to which the user 302 may move his body, e.g., his hands or legs, while sitting in his current position, without causing inconvenience to the fellow users 304 and 306. In addition to the virtual bounding box 308, the vehicle may also generate a representation 310 of the user 302 body. The representation 310 includes multiple segments 314 that represent specific portions of the user 302 body. As the user 302 moves, one or more these segments will move accordingly based on which part of the body of the user 302 is moving. The vehicle tracks the movement of these segments 314 to determine whether the user 302 is breaching the extent of the virtual bounding box 308 with his physical movements. For example, if the user 302 extends his left leg on the left side, the segment 314 associated with the left leg will also extend to the left side and likely at least a portion of the segment 314 will travel outside the limits of the virtual bounding box 308. In this instance, the vehicle can track the movement of the segment 314 and generate an alert if any portion of the segment 314 travels outside the virtual bounding box 308.

In another embodiment, the vehicle may also take into account the dimensions of the passenger cabin to determine the virtual bounding box 308. For example, the width, depth, and the height of the passenger cabin of the vehicle is known. Based on that data and the data about the user types of all the users 302, 304, and 306, the vehicle may determine the available area for the user 302 to move his body and based on that information determine the virtual bounding box 308. In operation, for the duration that the user 302 is wearing the virtual reality device 112, the vehicle can track the motion and gestures of the user 302. In the instance where the motion or gesture of the user 302 causes one or more body portions of the user 302 to breach the boundary of the virtual bounding box 308, the vehicle may generate an alert message. The alert message may be displayed on the virtual reality device 112, outputted via a speaker of the virtual reality device 112, displayed in the vehicle human-machine interface (HMI), or outputted via one or more speakers of the vehicle.

In some embodiments, the virtual bounding box 308 is not static. The size of the virtual bounding box 308 may be determined based on several factors such as number of other users in the vehicle, the vehicle internal dimensions, how many users are wearing a virtual reality device, etc. FIG. 3B illustrates an instance where a single user 318 is wearing the virtual reality device 112. In this instance, the vehicle determines that there is a single user 318 sitting in the back seat of the vehicle and wearing the virtual reality device 112. Since there are no other users currently in the vehicle, the vehicle determines a bounding box 316 for the user 318. The bounding box 316 spans almost the entire space in the back seat of the vehicle. The user 318 has a large area available for use. Next consider that the user 318 is now joined by another user 320 in the backseat as illustrated in FIG. 3C. The vehicle recognizes presence of the second user 320 in the vehicle and recalculates the bounding box dimensions and generates a new bounding box 322. In doing so, the vehicle determines relative positions/locations of the two users 318 and 320 with respect to each other (i.e. where they are seated, how far apart they are from each other, etc.) and with respect to the vehicle interior. Based on that data, the vehicle recalculates the bounding box dimensions and determines the new bounding box 322. As can be seen, the bounding box 322 is smaller in size compared to the bounding box 316. Thus, the bounding box dimensions may not be static and are dynamically adjusted. Further, if during a particular part of the trip the user 320 exits the vehicle, the vehicle will detect that the user 320 is no longer present in the vehicle and vehicle may revert the size of the bounding box to be the bounding box 316. This may be particularly true in a shared ride scenario where users may frequently enter and exit the vehicle at different times. The vehicle can dynamically adjust the size of the bounding box as the number of users in the vehicle changes.

In some embodiments, the vehicle may use pre-determined offsets for determining the size of the virtual bounding box. For example, after the vehicle determines that a user within the vehicle is wearing a virtual reality device and the type associated with that user, the vehicle may determine a virtual bounding box that closely tracks the outer contours of the user body. The vehicle may then add an offset value for the left and right edges of the bounding box to increase the size of the bounding box. For example, the vehicle may add an offset of 10 cm-20 cm to the initially determined bounding box thereby increasing the lateral dimensions (i.e. width or length) of the bounding box. This offset may be based on the type of the user wearing the virtual reality device, type of other users in the vehicle, and/or the vehicle internal dimensions. Similarly, the vehicle may determine an offset for the top and bottom edges of the bounding box. It is to be noted that the vehicle passenger cabin has fixed dimensions and the bounding box can never be larger than the vehicle internal dimensions.

In other embodiments, the vehicle may also take into account one or more objects within the vehicle to determine the bounding box. One of the potential issues of a user using a virtual reality device within a vehicle is that the user may inadvertently contact one or more vehicle controls if any portion of the user's body comes in contact with these controls. For example, a user playing a boxing game on his/her virtual reality device may inadvertently contact a climate control operation of the vehicle while moving his/her hands as part of playing the boxing game. It would be desirable to alert the user that he/she is getting close to any such vehicle control and prevent any such inadvertent contact with any vehicle control. In this instance, the vehicle determines whether there are one or more vehicle controls located in proximity of the user. The vehicle then determines a virtual bounding box such that the one or more controls are located at a threshold distance outside the bounding box. As the user is engaged with the virtual reality device, the vehicle tracks the user's motion and gestures and determines whether there is a likelihood of the user contacting any of those one or more controls. In the event that the user is frequently getting close to the edges of the virtual boundary box or breaching the virtual bounding box, the vehicle may output an alert message indicating that the user is likely to contact a particular vehicle control. This alert may be sent to the virtual reality device and may also be displayed on the HMI system of the vehicle. If the user fails to take the appropriate corrective action, the driver of the vehicle can inform the user of the issue and even terminate or interrupt the operation of the virtual reality device. In some instances, the vehicle may automatically terminate the operation of the virtual reality device if the user breaches the virtual bounding box more than a threshold number of times. The threshold may be determined based on the nature of the vehicle control or driver discretion.

In other embodiments, the identity of the users may also be used to determine the size of the virtual bounding box. For example, consider that members of a same family are travelling in the vehicle and two siblings are seated in the back seat. Either one or both of them may be using a virtual reality device. In this instance, the vehicle may determine that the two users sitting in the back seat are siblings, e.g., based on prior enrollment data, facial recognition, etc. The vehicle may take into account the familial relationship between the users in determining the size of the virtual bounding box. Since both the users belong to the same family, the vehicle may determine a virtual bounding box for each user that may be larger than a bounding box that the vehicle may determine if the two users were determined to be strangers, e.g., as in a ride share service vehicle.

Figures 3D, 4:
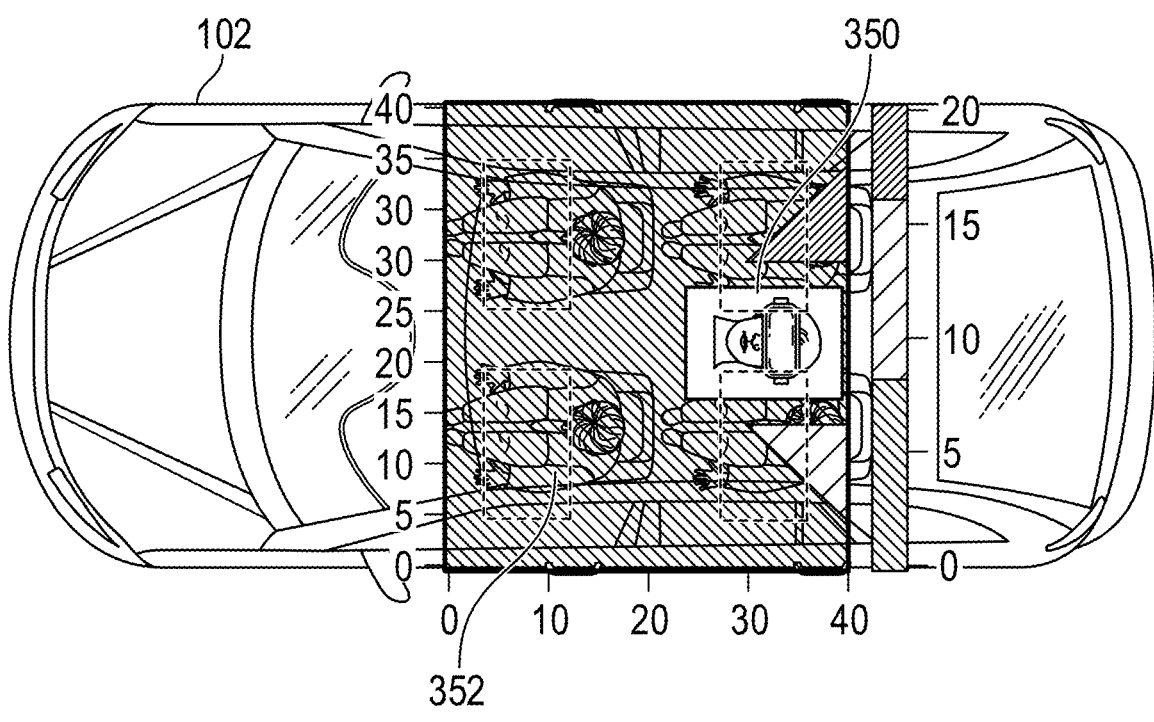
FIG. 4 illustrates a functional block diagram of a virtual reality management unit according to an embodiment of the present disclosure.

In other embodiments, where multiple users are wearing virtual reality devices within the vehicle, the vehicle may determine a virtual bounding box for each of the users and track the motion and gestures of each of the users to determine whether any of the users is breaching the boundary of their individual virtual bounding boxes. In an embodiment, there may be some overlap between the virtual bounding boxes of these multiple users. In another embodiment, the driver of the vehicle may be notified as to which user within the vehicle is currently using a virtual reality device. This notification may be in the form of a visual, a textual, or an audible message. For instance, the HMI system of the vehicle may display iconography depicting which user within the vehicle is currently using a virtual reality device. FIG. 3D illustrates an example of such a visual indication that may be displayed on the vehicle HMI system. As illustrated in FIG. 3D, the vehicle 102 may have five users currently occupying the vehicle 102. A first user 352 may be driving the vehicle, while the other four users are passengers in the vehicle 102. Out of the four passengers, the user 350 may be currently using a virtual reality device. In this instance, the HMI system of the vehicle may display the icon illustrated in FIG. 3D to indicate that the user occupying the middle position in the back seat is currently using a virtual reality device. If more than one user is using a virtual reality device, the display can be updated accordingly.

FIG. 4 illustrates a functional block diagram of a virtual reality management unit 242 according to an embodiment of the present disclosure. The virtual reality management unit 242 may be implemented as a stand-alone unit in the vehicle 102 or may be incorporated into the VCU 210 of the vehicle 102. The virtual reality management unit 242 may include a bounding box estimation unit 402, a motion and gesture tracking unit 404, an alert and notification unit 406 and a communication interface 408. The bounding box estimation unit 402 may receive sensor data such as image data, audio data, and/or video data captured by one or more sensors of the vehicle 102. Based on the sensor data and a priori knowledge of the various vehicle internal dimensions, the bounding box estimation unit 402 may determine a virtual bounding box for one or more occupants/users within the vehicle using the techniques described above. In an embodiment, the bounding box estimation unit may use image recognition and segmentation algorithms and machine learning models to identify the user that is wearing the virtual reality device, determine a type of the user, and then determine a virtual bounding box for the user. The bounding box estimation unit 402 may provide the virtual bounding box data to the motion and gesture tracking unit 404. The motion and gesture tracking unit 404 may receive real-time data from various sensors within the vehicle that capture user motion and gesture, e.g., an inward facing cabin camera. The motion and gesture tracking unit 404 may analyze the motion data based on the virtual bounding box information to determine whether any portion of the user's body is travelling outside or breaching the boundary of the virtual bounding box.

In the event that the motion and gesture tracking unit 404 determines that a portion of the user's body has breached the boundary of the virtual bounding box, it may send an indication to that effect to the alert and notification unit 406. The alert and notification unit 406 may then generate the appropriate message based on the data received from the motion and gesture tracking unit 404. The message generated by the alert and notification unit 406 may be outputted via the communication interface 408. The communication interface may either output the message via the HMI system of the vehicle 102 and/or send the message to the virtual reality device. The message may be outputted as a visual and/or audible message. In certain instances, in addition to sending a message to the virtual reality device, the virtual reality management unit 242 may send instructions to the virtual reality device that may cause the virtual reality device to shut down or interrupt the operation of the virtual reality device.

Figure 5:
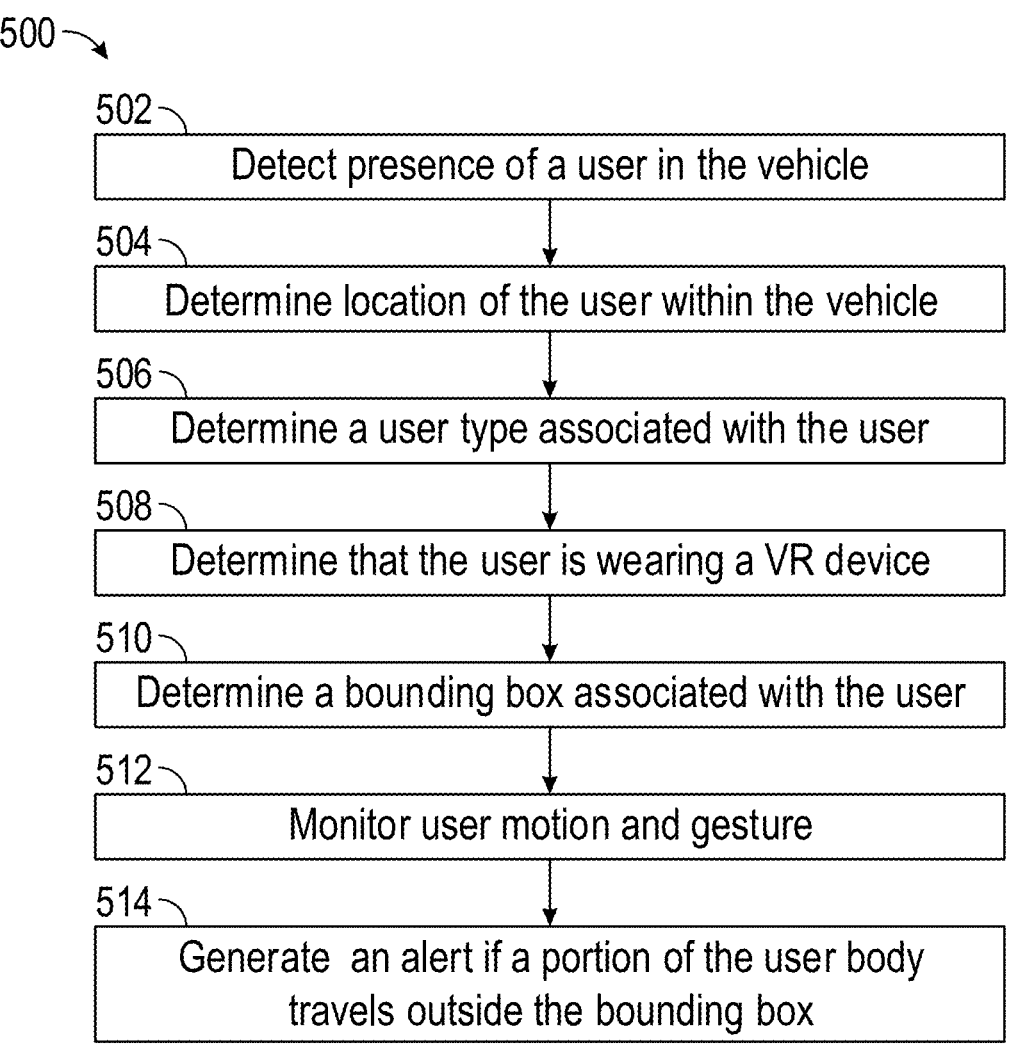
FIG. 5 is a flow diagram for a process according to an embodiment of the present disclosure.

FIG. 5 illustrates a flow diagram for a process 500 according to an embodiment of the present disclosure. Process 500 may be performed, e.g., by the vehicle 102 of FIG. 2. At step 502, the vehicle may detect the presence of one or more persons/users in the vehicle. In an embodiment, the vehicle may use one or more sensors such as cameras, proximity sensors, etc. to determine presence of a user in the vehicle. At step 504, the vehicle may determine the location of the user in the vehicle. For instance, the vehicle may determine whether the user is sitting in the front seat or back seat of the vehicle and where exactly in the front or the back seat is the user located. The vehicle may determine user location with respect to other users in the vehicle and/or with respect to the internal dimensions of the vehicle. At step 506, the vehicle may determine a type associated with the user. As described above, in one embodiment, the user may be identified as being of a small, medium, or large type depending on the size of the user. One skilled in the art will realize that determining type of the user based on the size is merely exemplary and there may be various other ways to determine a type of the user.

At step 508, the vehicle may determine that one or more users in the vehicle are wearing a virtual reality device. In one instance, the vehicle may analyze image data captured by the one or more sensors of the vehicle to determine which user is wearing a virtual reality device. Once the user wearing the virtual reality device is identified, the vehicle may then determine a virtual bounding box associated with that user at step 510. Thereafter, the vehicle may monitor the user motion and gestures in real-time at step 512. If the vehicle determines that one or more portions of the body of the user travel outside or breach the boundary of the virtual bounding box, the vehicle may generate an alert message at step 514. The alert message may be sent to the virtual reality device and/or to the HMI system of the vehicle to be outputted accordingly.

Figure 6:
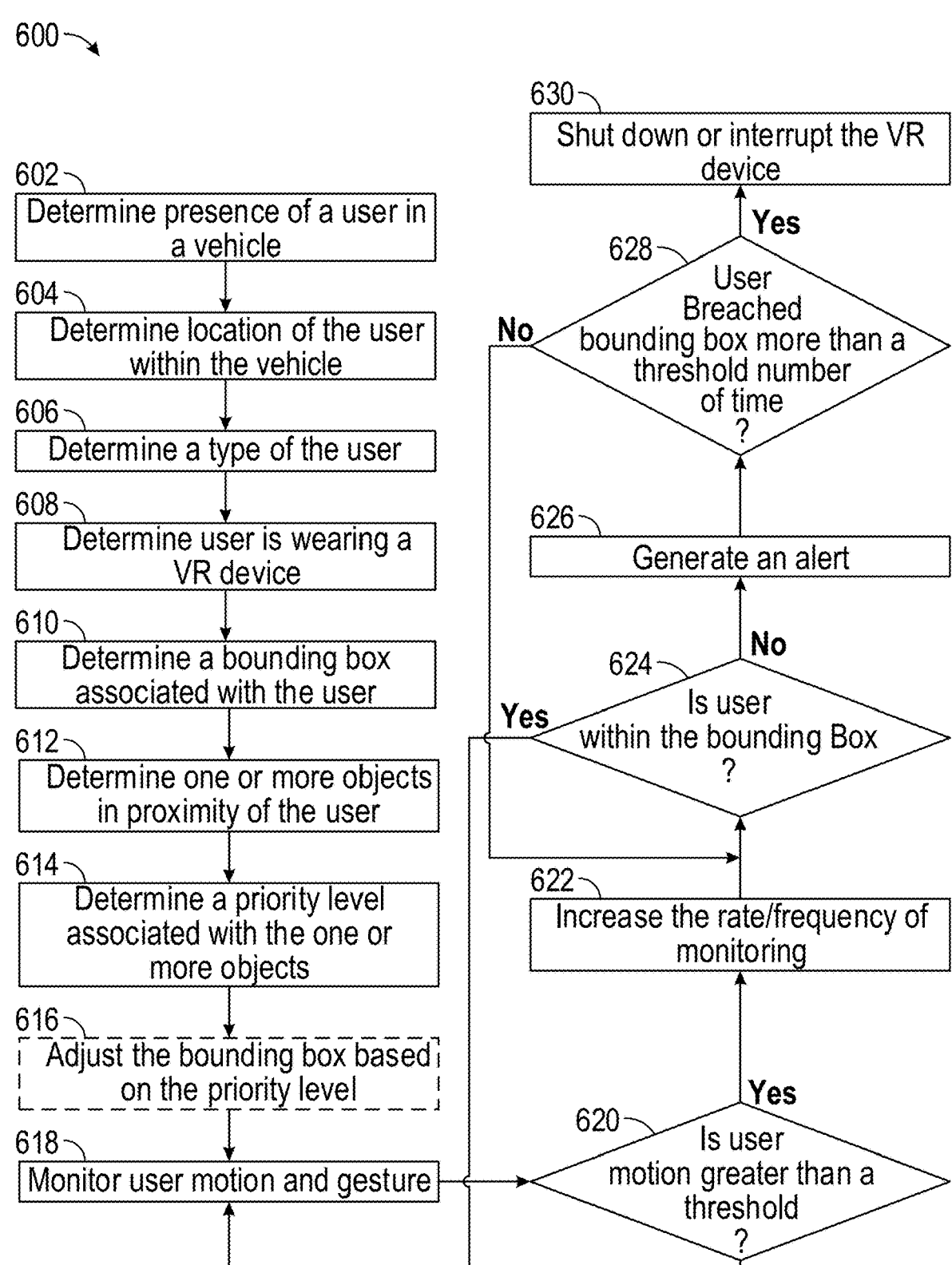
FIG. 6 is a flow diagram for a process according to another embodiment of the present disclosure.

FIG. 6 is a flow diagram for a process 600 according to another embodiment of the present disclosure. Process 600 may be performed, for example, by the vehicle 102 of FIG. 2 or the vehicle 102 in conjunction with the control server 104. At step 602, the vehicle may determine presence of a user in the vehicle. The vehicle may use any of the above-mentioned techniques for determining presence of a user in the vehicle. In some embodiments, if the vehicle detects multiple users in the vehicle, the vehicle may optionally determine an identity of each of the users. Based on the identity information, the vehicle may determine whether the multiple users are part of a same family. At step 604, the vehicle may determine the location of the user within the vehicle. In embodiments where multiple users are detected, the vehicle may determine the location of each user with respect to each other and/or with respect to the vehicle dimensions. At step 606, the vehicle may determine a type associated with the user. In case of multiple users, the vehicle may determine a type associated with each of the multiple users.

At step 608, the vehicle may determine that the user is wearing a virtual reality device. The vehicle may use any of the techniques described above to make this determination. In another embodiment, the vehicle may detect multiple users that are wearing a virtual reality device. Once the vehicle detects a user that is wearing a virtual reality device, the vehicle then determines a virtual bounding box for that user at step 610. This virtual bounding box is determined based on the type associated with the user, the location of the user, and the vehicle dimensions. In embodiments where multiple users are wearing a virtual reality device, a virtual bounding box for each user may be determined in a similar manner. At step 612, the vehicle may determine one or more objects in the vicinity of the user. These objects may include vehicle controls, luggage, other devices, or the like. In one embodiment, step 612 may be performed before step 610. The vehicle may then identify the one or more objects to determine whether there are any important vehicle controls included in the one or more objects. If it is determined that there are any vehicle controls in the one or more objects, the vehicle may adjust the virtual bounding box determined at step 610, if necessary, to ensure that the vehicle controls are outside the virtual bounding box. In an embodiment, where step 612 is performed before step 610, the initial virtual bounding box may be determined such that the vehicle controls are placed outside the virtual bounding box and hence an adjustment may not be needed.

At step 614, the vehicle may determine a priority level associated with the one or more objects and/or users. A priority level may be indicative of one or more features associated with the one or more objects or users. For example, the features may include, multiple users from the same family sitting in a back seat of the vehicle, multiple users wearing a virtual reality set and playing a community game, strangers sitting in a ride share vehicle, a user sitting close a specific vehicle control, etc. At step 616, the vehicle may further adjust the boundaries/size of the virtual bounding box based on the priority level information. For example, if multiple users from the same family are sitting together, the vehicle may relax the boundaries of the virtual bounding box compared to if multiple strangers are sharing a ride. In that situation, the vehicle may be more conservative in terms of determining the virtual bounding box, as strangers would be less inclined to let anyone else in their personal space compared to family members. Once the virtual bounding box is adjusted at step 616, the vehicle may monitor the user motion and gestures at step 618. It is to be noted that the monitoring is done in real time and on a continuous basis. In some embodiments, the vehicle may assign a default data rate for collecting motion and gesture data, e.g., 1 sec. Thus, at step 618, the vehicle starts collecting motion and gesture data based on the default data rate. This default data rate may be programmable and the owner of the vehicle may choose a data rate according to his/her liking.

At step 620, the vehicle checks whether the user motion is greater than a threshold. For example, a user watching a movie on his/her virtual reality device will have much less motion than a user playing a game on the virtual reality device. While the default data rate may be adequate for a relatively sedate activity like watching a movie, it may not be enough for accurately capturing the motion of the user who is playing a game. The threshold for the motion can be set based on user experience or empirical studies and experimentation. If it is determined at step 620, that the motion data associated with the user is within the threshold, the process 600 returns to step 618 and the vehicle continues to monitor user motion and gestures. If it is determined at step 620, that the user motion is above the threshold, the vehicle may increase the data rate for the motion data capture at step 622. Continuing our above example, the vehicle may increase the rate of motion data capture to every 300 milliseconds instead of the default 1 sec. In some embodiments, if the user motion increases for a first duration of time and then decreases for a second duration of time, the vehicle may first increase the data rate from its default value to a first rate for the first duration and the reduce the data rate from the first rate to a second rate for the second duration. Thus, the vehicle may dynamically adjust the data rate in real-time based on the user motion. In order to avoid frequent changes of the data rate, the vehicle may use a hysteresis function to account for any transient motion of the user.

After the vehicle determines a suitable data rate for collection of the motion data, the vehicle continues to monitor user motion with respect to the adjusted virtual bounding box determined in step 616. At step 624, the vehicle determines whether one or more portions of the user body travel outside or breach the boundaries of the virtual bound box. If it is determined that the user is staying within the virtual bounding box, the process 600 returns to step 618 and continues monitoring user motion and gesture. If at step 624, it is determined that the user has breached the virtual bounding box, the vehicle may generate an alert indicating that one or more portions of the body of the user travelled outside the virtual bounding box. This alert may be provided to the user, e.g., via the virtual reality device, and/or the driver of the vehicle, e.g., via the HMI system of the vehicle. In some embodiments, this alert message may be stored and recorded in a log entry by the vehicle and neither the user nor the driver of the vehicle may be notified of the breach. This may be done in order to avoid excessive notifications and to account for any transient motion by the user. Optionally, if at step 624, the vehicle determines that the user is staying within the virtual bounding box, the process 600 may loop back to step 624 and continue checking whether the user is breaching the boundary of the bounding box.

At step 628, the vehicle may determine whether the user has breached the virtual bounding box by greater than a threshold number of times. If the vehicle determines that the user has breached the virtual bounding box by greater than the threshold number of times, the vehicle may conclude that there is a high likelihood that the user may either physically come in contact with other users, if present, and/or inadvertently contact a vehicle control in the proximity. Based on this determination, the vehicle may shut down the virtually reality device, interrupt the operation, and/or pause the operation of the virtual reality device and provide an alert message to the user and/or the driver of the vehicle at step 630. If it is determined that the user has not breached the virtual bounding box the threshold number of times, the process 600 may return to step 624.

FIG. 7 is a flow chart for a process 700 according to yet another embodiment of the present disclosure. Process 700 may be performed, for example, by the vehicle 102 of FIG. 2 or the vehicle 102 in conjunction with the control server 104. At step 702, the vehicle may determine presence of a plurality of users in a vehicle. At step 704, the vehicle may determine a type associated with each of the plurality of users. At step 706, the vehicle may determine that a first user from among the plurality of users is wearing a virtual reality device. At step 708, the vehicle may determine that the first user is sitting next to a second user from among the plurality of users. At step 710, the vehicle may determine a virtual bounding box for each of the first user and the second user based on their individual user type and their location within the vehicle and with respect to each other. In this instance, the second user is not wearing a virtual reality device. At step 712, the vehicle may begin monitoring motion and gesture of the first user and begin capturing motion and gesture data in real-time. If the first user breaches the boundary of his/her virtual bounding box, the vehicle may generate an alert at step 714.

Consider that the vehicle is a ride share vehicle that transports multiple users to multiple locations and users enter and exit the vehicles at different times and locations. Assume at some point during the ride, the second user exits the vehicle. For example, user 304 of FIG. 3A exits the vehicle. As a result, the remaining users now may have more room within the vehicle and they may adjust their seating positions accordingly. At step 716, the vehicle may detect that the second user has left the vehicle and the remaining users, including the first user, have modified their seating locations. In response to these changes, the vehicle may adjust the boundary of the initial virtual bounding box, determined in step 710, to generate a modified bounding box at step 718. The modified bounding box may be bigger in size than the initial bounding box since there is at least one less user in the vehicle. Thereafter, the vehicle may now monitor motion and gesture of the first user with reference to the modified bounding box. Since the modified bounding box is likely bigger than before, the first user has more range of available motion than before.

At some point further during the ride, the vehicle may detect that a third user has entered the vehicle (step 722). Due to entry of the third user, it is likely that there will be another change in seating locations to accommodate the third user. After the vehicle detects presence of the third user in the vehicle, the vehicle determines the location and type of the third user with respect to the first user and with respect to the vehicle. The vehicle may re-determine the location of the first user too, as the first user may have meaningfully moved from his/her prior location. At step 726, the vehicle may re-adjust the bounding box that was modified at step 718, to generate a new bounding box for the first user. The new bounding box may be likely smaller than the modified bounding box as there are now more users in the vehicle. At step 728, the vehicle now resumes monitoring motion and gesture of the first user with reference to the new bounding box. Thus, the vehicle dynamically adjusts the size of the bounding box based on real-time data gathered by the vehicle sensors.

Figure 8:
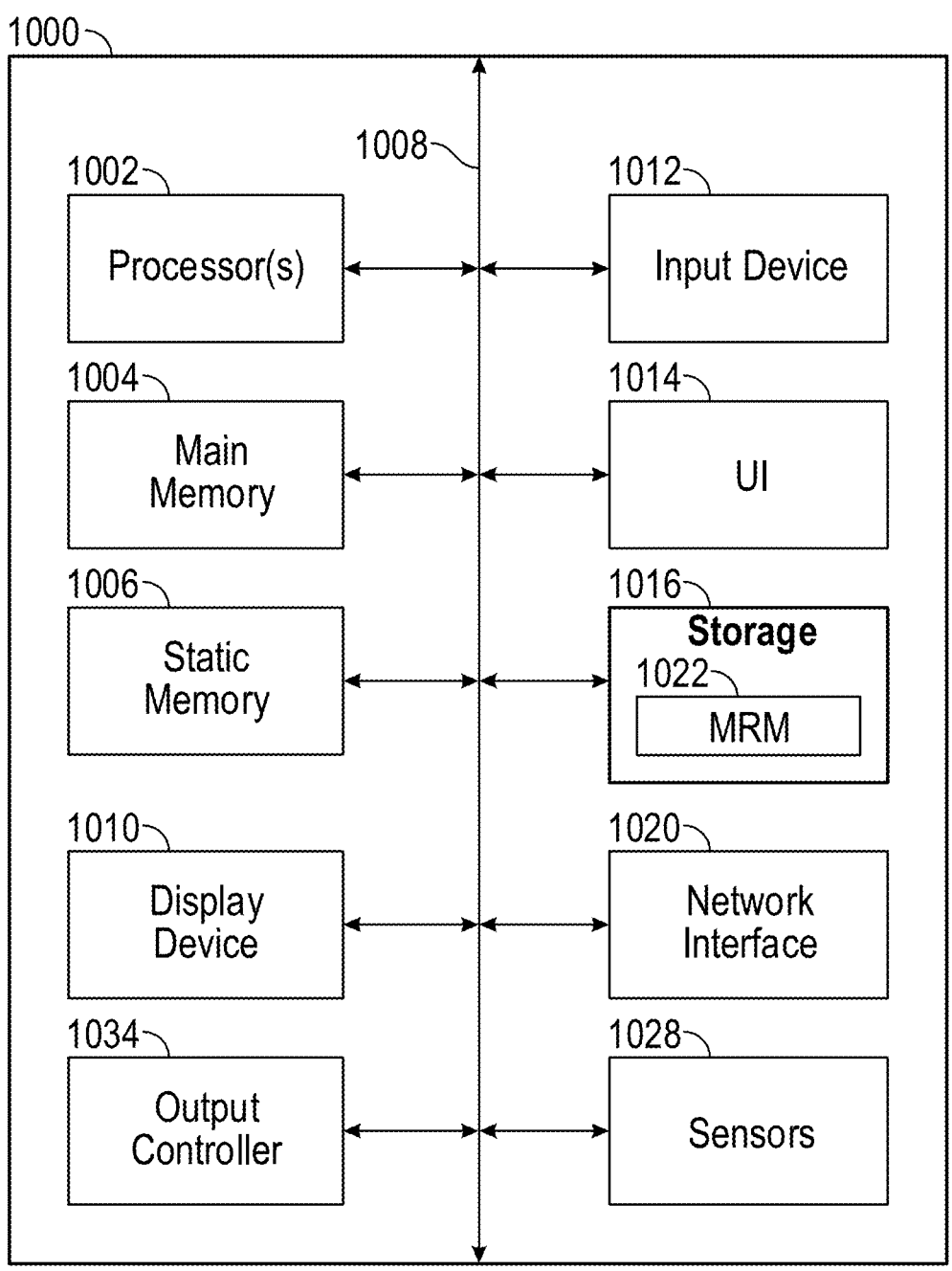
FIG. 8 depicts a block diagram of an example control server in accordance with one or more embodiments of the present disclosure.

FIG. 8 depicts a block diagram of an example control server 800, e.g., control server 104 of FIG. 1, upon which any of one or more techniques (e.g., methods) may be performed, in accordance with one or more example embodiments of the present disclosure. In other embodiments, the server 800 may operate as a standalone device or may be connected (e.g., networked) to other servers. In a networked deployment, the server 800 may operate in the capacity of a server machine, a client machine, or both in server-client network environments. In an example, the server 800 may act as a peer server in peer-to-peer (P2P) (or other distributed) network environments. The server 800 may be a personal computer (PC), a tablet PC, a set-top box (STB), a personal digital assistant (PDA), a mobile telephone, a smart key fob, a wearable computer device, a web appliance, a network router, a switch or bridge, or any machine capable of executing instructions (sequential or otherwise) that specify actions to be taken by that server, such as a base station. Further, while only a single server is illustrated, the term "server" shall also be taken to include any collection of servers that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific task when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The server (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The server 800 may further include a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The server 800 may additionally include a storage device (i.e., drive unit) 816, a network interface device/transceiver 820 coupled to antenna(s), and one or more sensors 828, such as a global positioning system (GPS) sensor, a compass, an accelerometer, or other sensor. The server 800 may include an output controller 834, such as a serial (e.g., universal serial bus (USB)), parallel, or other wired or wireless (e.g., infrared (IR)), near field communication (NFC), etc. connection to communicate with or control one or more peripheral devices (e.g., a printer, a card reader, etc.).

The storage device 816 may include a machine readable medium 822 on which is stored one or more sets of data structures or instructions (e.g., software) embodying or utilized by any one or more of the techniques or functions described herein. The instructions may also reside, completely or at least partially, within the main memory 804, within the static memory 806, or within the hardware processor 802 during execution thereof by the server 800. In an example, one or any combination of the hardware processor 802, the main memory 804, the static memory 806, or the storage device 816 may constitute machine-readable media.

While the machine-readable medium 822 is illustrated as a single medium, the term "machine-readable medium" may include a single medium or multiple media (e.g., a centralized or distributed database, and/or associated caches and servers) configured to store the one or more instructions.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the server 800 and that cause the server 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions may further be transmitted or received over a communications network using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the server 800 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

It is to be noted that the vehicle implements and/or performs operations, as described here in the present disclosure, in accordance with the owner manual and safety guidelines. In addition, any action taken by the vehicle owner/driver based on recommendations or notifications provided by the vehicle should comply with all the rules specific to the location and operation of the vehicle (e.g., Federal, state, country, city, etc.). The recommendation or notifications, as provided by the vehicle, should be treated as suggestions and only followed according to any rules specific to the location and operation of the vehicle. In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:

determining, by a vehicle, presence of a user in the vehicle;

determining, by the vehicle, a location of the user within the vehicle;

determining, by the vehicle, that the user is wearing a virtual reality (VR) device;

determining, by the vehicle, a virtual bounding box for the user based on the location of the user and one or more dimensions of the vehicle;

determining, by the vehicle, one or more objects in the vicinity of the user within the vehicle and relative locations of the one or more objects with respect to the user;

determining, by the vehicle, a priority level associated with each of the one or more objects;

determining, by the vehicle, motion and gesture data associated with the user;

determining, by the vehicle based on the motion and gesture data, that the user is likely to make contact with a first object, of the one or more objects, the first object being associated with a first priority level;

generating a message alerting the user of a potential contact; and prior to generating the message, determining, by the vehicle, that the user has breached the virtual bounding box greater than a threshold amount.

2. The method of claim 1, further comprising, determining, by the vehicle, a type of the user, wherein the type is based on a size of the user and wherein determining the virtual bounding box is further based on the type of the user.

3. The method of claim 1, further comprising, adjusting, by the vehicle, the virtual bounding box based on the priority level.

4. The method of claim 3, wherein the first object is located in a first direction with respect to the user, the method further comprising:

determining, by the vehicle, a second object, of the one or more objects, that is associated with a second priority level that is lower than the first priority level, the second object being a second direction with respect to the user; and wherein adjusting the virtual bounding box further comprises:

adjusting the bounding box such that a first distance between a first edge of the virtual bounding box and the first object in the first direction is less than a second distance between a second edge of the bounding box and the second object in the second direction.

5. The method of claim 1, further comprising:

determining, by the vehicle, that the user has breached the virtual bounding box for a first number of times;

determining, by the vehicle, that the first number is greater than the threshold number; and shutting down, by the vehicle, the VR device.

6. The method of claim 1, wherein the one or more objects include additional users, vehicle controls, or luggage.

7. A vehicle comprising:

one or more processors;

one or more memories storing instructions and coupled to the one or more processors; and one or more sensors coupled to the one or more processors, wherein the one or more processors are configured to execute the one or more instructions that cause the vehicle to:

determine, using the one or more sensors, presence of a user in the vehicle;

determine a location of the user within the vehicle;

determine that the user is wearing a virtual reality (VR) device;

determine a virtual bounding box for the user based on the location of the user and one or more dimensions of the vehicle;

determine one or more objects in the vicinity of the user within the vehicle and relative locations of the one or more objects with respect to the user;

determine a priority level associated with each of the one or more objects;

determine motion and gesture data associated with the user;

determine, based on the motion and gesture data, that the user is likely to make contact with a first object, of the one or more objects, the first object being associated with a first priority level;

generate a message alerting the user of a potential contact;

determine that the user has breached the virtual bounding box for a first number of times;

determine that the first number is greater than a threshold number; and shut down the VR device.

8. The vehicle of claim 7, wherein the one or more objects include vehicle controls or luggage.

9. The vehicle of claim 7, wherein the one or more processors are configured to execute the one or more instructions that further cause the vehicle to adjust the virtual bounding box based on the priority level.

10. The vehicle of claim 9, wherein the first object is located in a first direction with respect to the user and the one or more processors are configured to execute the one or more instructions that further cause the vehicle to:

determine a second object, of the one or more objects, that is associated with a second priority level that is lower than the first priority level, the second object being a second direction with respect to the user; and wherein to adjust the virtual bounding box, the one or more processors are configured to execute the one or more instructions that further cause the vehicle to:

adjust the bounding box such that a first distance between a first edge of the virtual bounding box and the first object in the first direction is less than a second distance between a second edge of the bounding box and the second object in the second direction.

11. The vehicle of claim 7, wherein the one or more processors are configured to execute the one or more instructions that further cause the vehicle to determine a type of the user, wherein the type is based on a size of the user and wherein the virtual bounding box is determined further based on the type of the user.

12. The vehicle of claim 7, wherein the one or more processors are configured to execute the one or more instructions that further cause the vehicle to, prior to generating the message, determine that the user has breached the virtual bounding box greater than the threshold amount of times.

13. A method comprising:

determining, by a vehicle, at a first time, presence of a first user in the vehicle;

determining, by the vehicle at the first time, presence of a second user in the vehicle;

determining, by the vehicle, a relative locations of the first user and the second user with respect to each other and an interior of the vehicle;

determining, by the vehicle, that the first user is wearing a virtual reality device;

determining, by the vehicle, a first bounding box for the first user based on a relative location of the first user with respect to the second user;

determining, by the vehicle at a second time, absence of the second user in the vehicle;

adjusting, by the vehicle, the first bounding box to generate a second bounding box, wherein a first area of the first bounding box is smaller than a second area of the second bounding box.

14. The method of claim 13, further comprising:

determining, by the vehicle, a first type associated with the first user;

determining, by the vehicle, a second type associated with the second user;

wherein determining the first bounding box is based further on the first type and the second type.

15. The method of claim 13, further comprising:

determining motion and gesture data associated with the first user;

determining, based on the motion and gesture data, that the user has breached the first bounding box; and generating an alert message indicative of the breach.

16. The method of claim 13, further comprising monitoring motion of the first user based on the second bounding box.

17. The method of claim 13, further comprising:

determining, at a third time, that a third user has entered the vehicle;

determining a third location of the third user with respect to the first user;

determining a first type associated with the first user;

determining, a second type associated with the second user; and adjusting the second bounding box to generate a third bounding box based on the first type, the second type, and the third location.

18. The method of claim 17, wherein the second area is larger than a third area of the third bounding box.

19. A method comprising:

determining, by a vehicle, presence of a user in the vehicle;

determining, by the vehicle, a location of the user within the vehicle;

determining, by the vehicle, that the user is wearing a virtual reality (VR) device;

determining, by the vehicle, a virtual bounding box for the user based on the location of the user and one or more dimensions of the vehicle;

determining, by the vehicle, one or more objects in the vicinity of the user within the vehicle and relative locations of the one or more objects with respect to the user;

determining, by the vehicle, a priority level associated with each of the one or more objects;

determining, by the vehicle, motion and gesture data associated with the user;

determining, by the vehicle based on the motion and gesture data, that the user is likely to make contact with a first object, of the one or more objects, the first object being associated with a first priority level; and generating a message alerting the user of a potential contact; and adjusting, by the vehicle, the virtual bounding box based on the priority level, wherein the first object is located in a first direction with respect to the user, the method further comprising determining, by the vehicle, a second object, of the one or more objects, that is associated with a second priority level that is lower than the first priority level, the second object being a second direction with respect to the user, and wherein adjusting the virtual bounding box further comprises adjusting the bounding box such that a first distance between a first edge of the virtual bounding box and the first object in the first direction is less than a second distance between a second edge of the bounding box and the second object in the second direction.

* * * * *